US008646368B1

(12) United States Patent
Clark

(10) Patent No.: US 8,646,368 B1
(45) Date of Patent: Feb. 11, 2014

(54) CROWN MOLDING CUTTING JIG

(75) Inventor: Scott L. Clark, Boone, IA (US)

(73) Assignee: KREG Enterprises, Inc., Huxley, IA (US)

( * ) Notice: Subject to any disclaimer, the term of this patent is extended or adjusted under 35 U.S.C. 154(b) by 674 days.

(21) Appl. No.: 12/428,184

(22) Filed: Apr. 22, 2009

Related U.S. Application Data

(60) Provisional application No. 61/046,945, filed on Apr. 22, 2008.

(51) Int. Cl.
*B25B 27/14* (2006.01)
*B27B 19/00* (2006.01)
*B23Q 3/18* (2006.01)
*B25B 1/22* (2006.01)
*B23Q 3/00* (2006.01)

(52) U.S. Cl.
USPC .............. 83/468.3; 83/477; 269/59; 269/304; 269/79

(58) Field of Classification Search
USPC ........ 83/762–766, 471, 473, 753, 468.3, 477; 269/289 R, 304, 16, 79, 58, 74, 68, 59, 269/71, 291, 60, 136, 139, 99; 29/281.1
See application file for complete search history.

(56) References Cited

U.S. PATENT DOCUMENTS 977,397 A * 11/1910 Peterson ........................ 248/455
1,191,424 A * 7/1916 Hollinger ....................... 248/460
1,249,340 A * 12/1917 Cromwell ...................... 248/215
1,351,358 A * 8/1920 Urbaner ........................ 72/31.11
1,443,998 A * 2/1923 Meltzer ............................ 33/443
1,507,815 A * 9/1924 Cumner ........................... 269/79
1,551,995 A * 9/1925 Lovenston ........................ 33/537
1,571,131 A * 1/1926 McIntosh ........................ 248/456
1,735,292 A * 11/1929 Moratz .......................... 248/454
1,767,950 A * 6/1930 Westbrook ..................... 248/454
1,797,889 A * 3/1931 Wiberg .......................... 248/454
2,017,518 A * 10/1935 Wagner ......................... 248/456
2,419,721 A * 4/1947 Kopp ............................. 248/456
2,771,821 A * 11/1956 Beusch ........................... 269/59
3,200,503 A * 8/1965 Gutknecht ........................ 33/536
3,982,636 A * 9/1976 Furuto ........................... 414/678
4,116,413 A * 9/1978 Andersen ....................... 248/451
4,154,435 A * 5/1979 Alessio .......................... 269/139
4,281,827 A 8/1981 Horwath
4,295,623 A * 10/1981 Schweizer ..................... 248/456
4,295,624 A * 10/1981 Granada ........................ 248/456
4,452,234 A * 6/1984 Withjack ....................... 126/627
4,458,874 A * 7/1984 Rabas et al. .................. 248/670

(Continued)

OTHER PUBLICATIONS

Milescraft, "CROWN45 Manual" www.milescraft.com, 2007, (8 pgs.).

(Continued)

*Primary Examiner* — Kenneth E. Peterson
*Assistant Examiner* — Samuel A Davies
(74) *Attorney, Agent, or Firm* — Zarley Law Firm, P.L.C.

(57) ABSTRACT

A jig for supporting a crown molding segment during a cutting operation comprises a base and a support having a crown molding support surface. The support is attached to the base at an adjustable angle. The jig further comprises an extendable brace attached between the base and the support. The extendable brace adapted to hold the support and the crown molding support surface at a predetermined angle relative to the base. The extendable brace is adjustable to facilitate adjustment of the jig corresponding to multiple crown molding spring angles.

20 Claims, 8 Drawing Sheets

(56) References Cited

U.S. PATENT DOCUMENTS

| | | | | | |
|---|---|---|---|---|---|
| 4,466,601 | A | * | 8/1984 | Raines | 269/79 |
| 4,467,991 | A | * | 8/1984 | Bailes | 248/447.1 |
| 4,618,119 | A | * | 10/1986 | Powell | 248/456 |
| 4,674,432 | A | * | 6/1987 | Schmanski | 116/63 P |
| 4,749,013 | A | * | 6/1988 | Ducate, Sr. | 144/145.1 |
| 4,842,453 | A | * | 6/1989 | Raines et al. | 408/89 |
| 4,875,399 | A | | 10/1989 | Scott et al. | |
| 4,884,604 | A | * | 12/1989 | Rice et al. | 144/84 |
| 4,901,989 | A | * | 2/1990 | Stellato | 269/17 |
| 4,964,449 | A | * | 10/1990 | Conners | 144/286.1 |
| 4,978,096 | A | * | 12/1990 | Struckmann | 248/451 |
| 5,005,795 | A | * | 4/1991 | Holmgren | 248/449 |
| 5,226,345 | A | * | 7/1993 | Gamble | 83/745 |
| 5,239,905 | A | | 8/1993 | Dunn | |
| 5,396,937 | A | * | 3/1995 | Clausen | 144/135.2 |
| 5,484,124 | A | * | 1/1996 | Billings | 248/118 |
| 5,730,434 | A | | 3/1998 | Schoene et al. | |
| 5,899,421 | A | * | 5/1999 | Silverman | 248/175 |
| 5,915,661 | A | * | 6/1999 | Silverman et al. | 248/465.1 |
| 6,098,952 | A | * | 8/2000 | Tonn | 248/688 |
| 6,175,999 | B1 | * | 1/2001 | Sloan et al. | 29/281.4 |
| 6,279,800 | B1 | * | 8/2001 | Lee | 224/276 |
| 6,374,879 | B1 | | 4/2002 | Lukehart | |
| 6,420,679 | B1 | * | 7/2002 | Mierczynski | 219/121.82 |
| 6,422,117 | B1 | | 7/2002 | Burch | |
| 6,481,320 | B1 | | 11/2002 | McGrory et al. | |
| D481,603 | S | | 11/2003 | Kelley | |
| 6,659,439 | B1 | * | 12/2003 | Baumgartner et al. | 269/43 |
| 6,775,917 | B1 | * | 8/2004 | Campbell | 33/640 |
| 6,782,782 | B1 | | 8/2004 | Shangle et al. | |
| 6,857,829 | B2 | * | 2/2005 | Newton et al. | 408/89 |
| 6,938,528 | B2 | * | 9/2005 | Lewis | 83/13 |
| 7,111,537 | B2 | | 9/2006 | Vallone | |
| 7,134,612 | B2 | * | 11/2006 | Bertucci et al. | 239/304 |
| 7,156,008 | B2 | | 1/2007 | Talesky | |
| D557,296 | S | | 12/2007 | Apodaca | |
| 7,360,476 | B2 | | 4/2008 | Berthiaume | |
| 7,487,940 | B2 | * | 2/2009 | Saez et al. | 248/176.1 |
| 7,546,995 | B2 | * | 6/2009 | Axel | 248/444 |
| 7,753,170 | B1 | * | 7/2010 | Gibson | 182/107 |
| 7,854,072 | B2 | * | 12/2010 | Stark | 33/537 |
| 2006/0230901 | A1 | | 10/2006 | Figurski | |
| 2007/0057140 | A1 | * | 3/2007 | Liou et al. | 248/456 |
| 2007/0102611 | A1 | * | 5/2007 | Seil et al. | 248/311.2 |
| 2007/0137450 | A1 | * | 6/2007 | Nagyszalancy | 83/13 |
| 2007/0261527 | A1 | * | 11/2007 | Wang | 83/477.1 |
| 2008/0276779 | A1 | * | 11/2008 | Kozina et al. | 83/471.3 |

OTHER PUBLICATIONS

Cut-N-Crown, Inc., "Cut-N-Crown—All Products", http://www.cutncrown.com/all_products.php, 2007, (4 pgs.).

* cited by examiner

CROWN MOLDING CUTTING JIG

This application claims the benefit of U.S. Provisional Application No. 61/046,945, filed Apr. 22, 2008, the entire content of which is hereby incorporated by reference.

TECHNICAL FIELD

The invention relates to jigs used for positioning workpieces during cutting operations.

BACKGROUND

Crown molding is an ornamental strip used to cover a seam or interface in a building, such as the perimeter of ceiling or at the tops of cabinets. Crown molding segments often interface at corners, such as the corner of a room or cabinet. Crown molding segments can have different spring angles, i.e., the angle a crown molding segment is designed to mount against a wall at. Creating crown molding segments that properly align in a corner requires a compound angled cut. One technique to create the compound angled cut is to use a miter saw to make an angled cut while holding a crown molding segment at an angle equivalent to the spring angle of the crown molding segment.

SUMMARY

Embodiments of the invention are directed to techniques for holding a crown molding segment at a proper angle to facilitate a compound angled cut. For example, a jig is described herein that comprises three portions: a support having a crown molding support surface, a base and a brace that holds the support and the crown molding support surface at a stationary angle relative to the base. The mounting surface, the base and the brace are adjustably attached to each other to facilitate adjustment of the jig corresponding to multiple spring angles. For example, the jig may be configurable to support crown molding segments for each of a set of standard crown molding spring angles, such as 38 degrees, 45 degrees and 52 degrees.

In one embodiment, the invention is directed to a jig for supporting a crown molding segment during a cutting operation comprising a base and a support having a crown molding support surface. The support is attached to the base at an adjustable angle. The jig further comprises an extendable brace attached between the base and the support. The extendable brace adapted to hold the support and the crown molding support surface at a predetermined angle relative to the base. The extendable brace is adjustable to facilitate adjustment of the jig corresponding to multiple crown molding spring angles.

In another embodiment, the invention is directed to a method comprising placing a crown molding segment on a jig. The jig comprises a base and a support having a crown molding support surface. The support is attached to the base at an adjustable angle. The jig further comprises an extendable brace attached between the base and the support. The extendable brace adapted to hold the support and the crown molding support surface at a predetermined angle relative to the base. The extendable brace is adjustable to facilitate adjustment of the jig corresponding to multiple crown molding spring angles. The method further comprises aligning the jig with a saw, and cutting the crown molding segment with the saw.

In another embodiment, the invention is directed to jig for supporting a crown molding segment during a cutting operation comprising a support including a crown molding support surface; and a means for adjusting the jig to any of a plurality of settings, wherein the plurality of settings correspond to multiple crown molding spring angles.

Embodiments of the invention may provide one or more advantages. For example, embodiments of the invention allow a single jig to be used for cutting crown molding segments having different spring angles. Embodiments of the invention may also allow crown molding segments for both sides of a corner to but cut without reconfiguring a jig.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
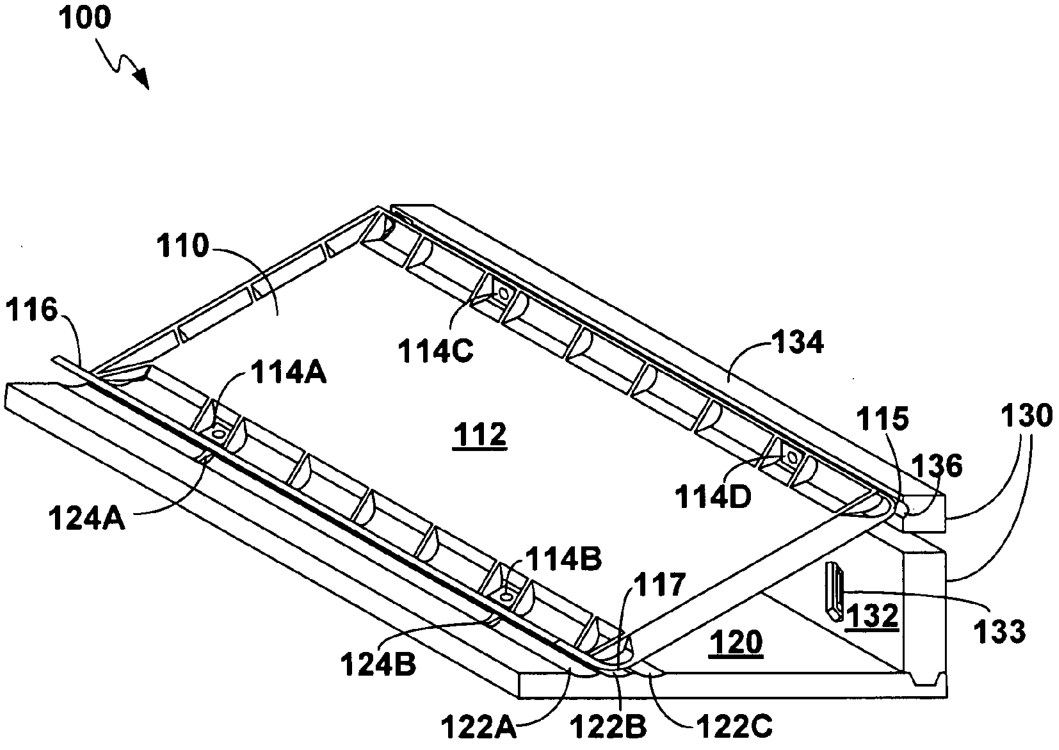
FIGS. 1A-1D illustrate a jig for supporting a crown molding segment during a cutting operation.

FIGS. 1A-1D, 2 and 3 illustrate an example embodiment of a jig 100. Jig 100 is designed to support a crown molding segment during a cutting operation and can be adjusted to support crown molding segments having different spring angles. For example, jig 100 may be configurable to support crown molding segments for each of a set of pre-defined, industry-standard crown molding spring angles, such as the commonly used spring angles of 38 degrees, 45 degrees and 52 degrees.

In this example, jig 100 includes support 110, which has crown molding support surface 112 and lip 116. Crown molding support surface 112 and lip 116 combine to hold a crown molding segment (not shown) at a desired angle relative to a cutting tool during a cutting operation.

Jig 100 also includes base 120, which provides stable positioning of the jig on a cutting platform or other workspace. For example, base 120 includes a flat bottom surface that allows jig 100 to sit flatly on a cutting platform of a cutting tool. Because lip 116 is at a consistent height relative to base 120, jig 100 supports a crown molding segment in a horizontal position parallel to the cutting platform of the cutting tool. Base 120 is adjustably attached to support 110 via bolts 114A and 114B. As will be described in greater detail, base 120 includes slots 124A and 124B (hereinafter referred to collectively as "slots 124") and grooves 122A, 122B and 122C (hereinafter referred to collectively as "grooves 122"), which combine with bolts 114A and 114B allow support 110 to be adjusted to provide multiple relative angles between support surface 112 and the bottom surface of base 120.

Jig 100 further includes extendable brace 130. Extendable brace 130 is fixedly attached to base 120 and adjustably attached to support 110 via bolts 114C and 114D. Extendable brace 130 is attached to base 120 at an angle of approximately 90 degrees. An angle of approximately 90 degrees between base 120 and extendable brace 130 allows outer surface 121 of extendable brace 130 to fit flatly against a fence of a cutting device and, therefore, be precisely aligned with the fence of the cutting device when jig 100 is placed on a cutting platform of the cutting device. Such an alignment allows for a precise cutting angle for a blade of the cutting device during a cutting operation of a crown molding segment located on jig 100. However, the side of jig 100 opposite to extendable brace 130 is also straight and can also be used to align jig 100 with the fence of the cutting device. Suitable cutting devices include a chop saw, a miter saw or another cutting device.

Extendable brace 130 includes lower portion 132 and upper portion 134 and provides a single degree of freedom between lower portion 132 and upper portion 134. Upper portion 134 is slideably engaged with lower portion 132. For example, lower portion 132 may form one or more slots that receive corresponding extrusions extending downward from upper portion 134. The length of extendable brace 130 can be adjusted by sliding upper portion 134 relative to lower portion 132. Movement of upper portion 134 relative to lower portion 132 is limited by the length of slot 133 in lower portion 132. For example, a bolt or screw may pass through slot 133 and a corresponding hole in a respective extrusion extending downward from upper portion 134. As another example, upper portion 134 may include an extruded peg that extends into slot 133. Lower portion 132 may also include an additional slot that combines with an additional peg, bolt or screw that functions in the same manner to add stability to upper portion 134. In some embodiments, bolts or screws, such as a bolt or screw in slot 133, may be used to secure extendable brace 130 at a desired extension.

Lower portion 132 may be attached to base 120 with, for example, glue or screws. As another example, lower portion 132 may be integrated with base 120 as a single component, such as an injection molded component. In fact, each of support 110, base 120 and extendable brace 130 may be injection molded components made from polymers or glass-filled resins. In other instances, one or more of support 110, base 120 and extendable brace 130 may be made from a metal, such as steel, wood or other suitable material.

Support 110 includes rounded surface 117, which mates with one of grooves 122 of base 120 depending on the current spring angle configuration of jig 100. Support 110 also includes rounded surface 115, which mates with rounded surface 136 on upper portion 134 of extendable brace 130. The adjustable connection between support 110 and base 120 as well as the adjustable connection between support 110 are fixed by bolts 114A, 114B, 114C and 114D (hereinafter referred to collectively as "bolts 114") to hold jig 100 at a desired spring angle configuration.

Figure 1B:
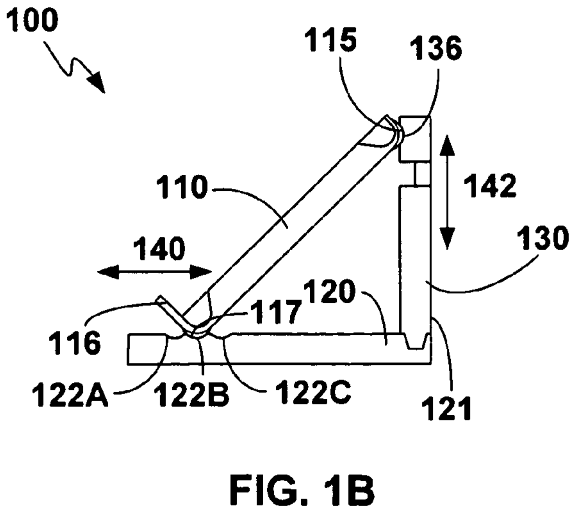

Adjustment of jig 100 is described with specific reference to FIG. 1B. FIG. 1B illustrates a side view of jig 100 adjusted to a middle value spring angle. For example, FIG. 1B illustrates an embodiment in which jig 100 is adjustable to a set of standard spring angles of 38 degrees, 45 degrees and 52 degrees. Specifically, FIG. 1B illustrates jig 100 as initially configured to a spring angle of 45 degrees. Jig 100 is adjusted by loosening bolts 114 and bolts or screws in slot 133 (if any) and any other slots in lower portion 132 of extendable brace 130. Then, the angle of support 110 can be adjusted as desired (i.e., increased or decreased to any of the standard angles) by moving the end of support 110 attached to base 120 in a direction parallel to line 140 and adjusting the extension of extendable brace 130 in a direction parallel to line 142, as shown in FIG. 1B. The end of support 110 attached to base 120 is then located such that rounded surface 117 mates with one of grooves 122. Extendable brace 130 is adjusted simultaneously to a corresponding position.

For example, for a spring angle configuration of 38 degrees, extendable brace 130 may be in a fully collapsed position while rounded surface 117 of support 110 is mated with groove 122A. As another example, for a spring angle configuration of 52 degrees, extendable brace 130 may be in a fully extended position while rounded surface 117 of support 110 is mated with groove 122C. Once support 110 is in a desired position corresponding to the spring angle of a crown molding segment to be supported by jig 100 during a cutting operation, bolts 114 and bolts in slot 133 (if any) and any other slots in lower portion 132 of extendable brace 130 are retightened to fix the position of support 110 relative to base 120.

In some embodiments, the interaction between lower portion 132 and upper portion 134 of extendable brace 130 may include positive stops corresponding to common spring angles, e.g., 38 degrees, 45 degrees and 52 degrees. The positive stops may include the two ends of slot 133 and any other slots, if any, in lower portion 132. Additionally, slot 133 may include one or more notches that allow a bolt or peg extending from upper portion 134 to snap in to provide an extended position for extendable brace 130 corresponding to a known spring angle. As an example, the two ends of slot 133 may correspond to spring angles of 38 and 52 degrees, whereas a notch in the middle of slot 133 corresponds to a spring angle of 45 degrees. In other embodiments, extendable brace 130 may not include positive stops. Because extendable brace 130 only provides a single degree of freedom, once rounded surface 117 of support 112 is positioned at a desired one of grooves 122, the angle of support 110 relative to base 120 is not adjustable even though the extension position of extendable brace 130 may not be separately secured.

Figure 1C:
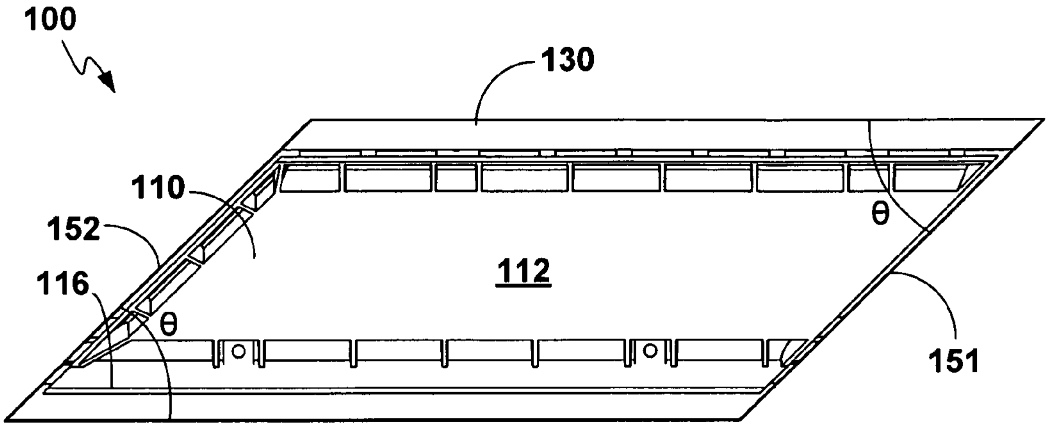
Figure 1D:
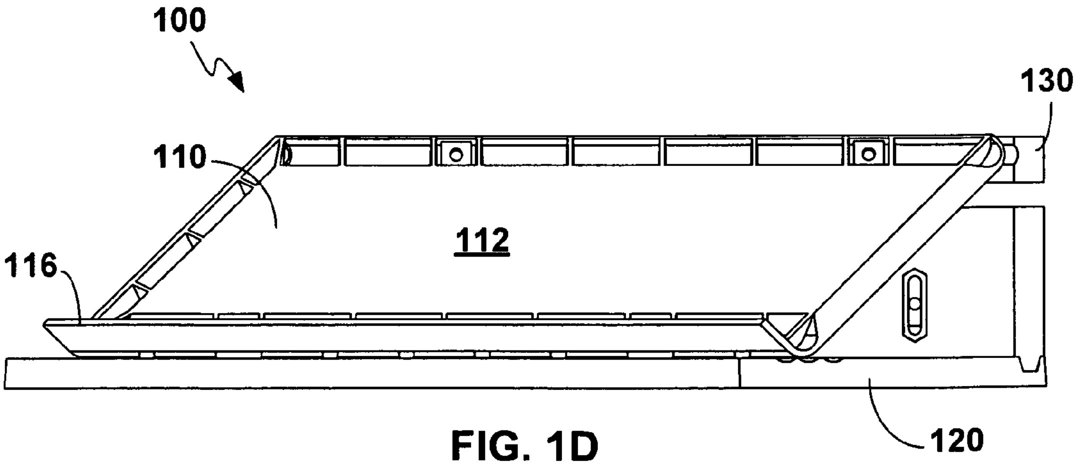

As best illustrated in FIG. 1C, the exemplary jig 100 provides a parallelogram footprint with an acute angle of θ. As one example, θ may be equal to approximately 45 degrees. This design allows jig 100 to be used to support crown molding segments during a cutting operation for both sides of a corners without adjustment of jig 100. For example, edge 151 may used to support crown molding segment 200 (FIG. 5) during a cutting operation, while edge 152 may used to support crown molding segment 250 (FIG. 5) during a cutting operation.

Figure 2:
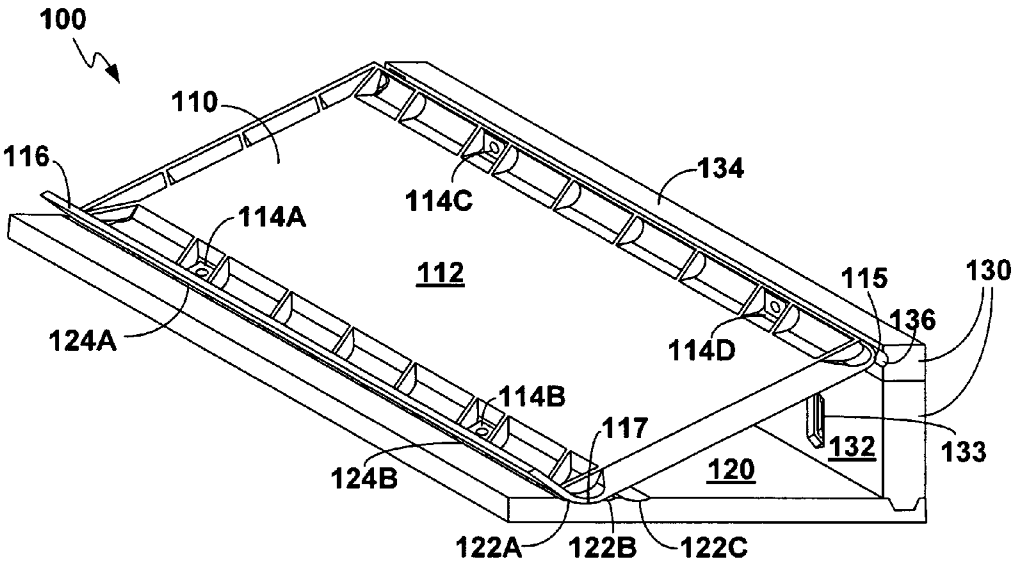
FIGS. 2 and 3 illustrate the jig of FIG. 1 adjusted for different crown molding spring angles.
Figure 3:
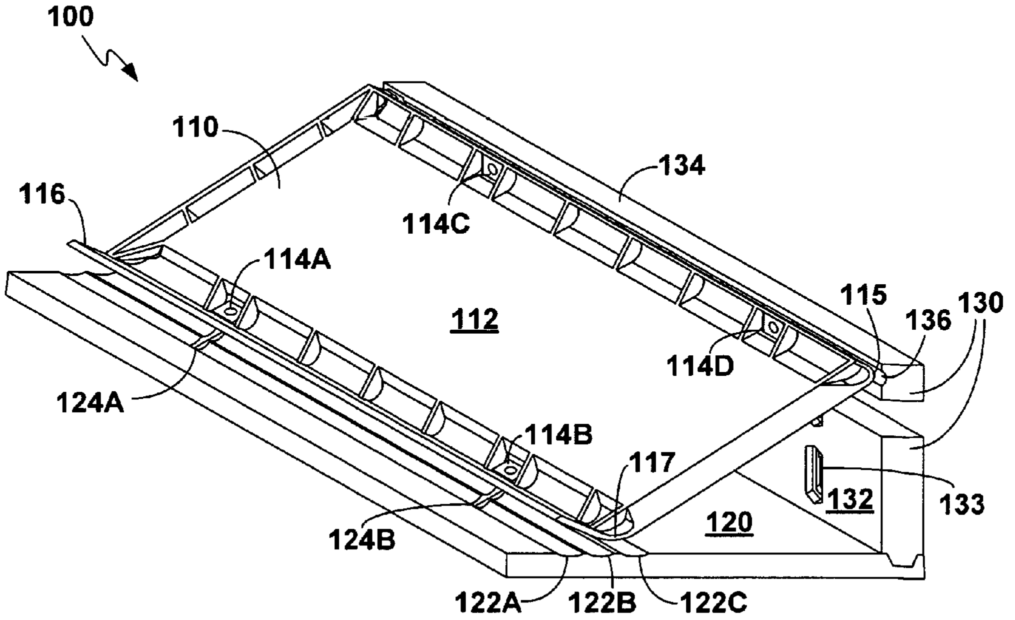

FIGS. 2 and 3 illustrate jig 100 adjusted to different crown molding spring angle configurations. Specifically, FIG. 1A illustrates jig 100 adjusted to correspond to a crown molding segment having a spring angle of 45 degrees, while FIG. 2 illustrates jig 100 adjusted to correspond to a crown molding segment having a spring angle of 38 degrees, and FIG. 3 illustrates jig 100 adjusted to correspond to a crown molding segment having a spring angle of 52 degrees.

Figure 4B:
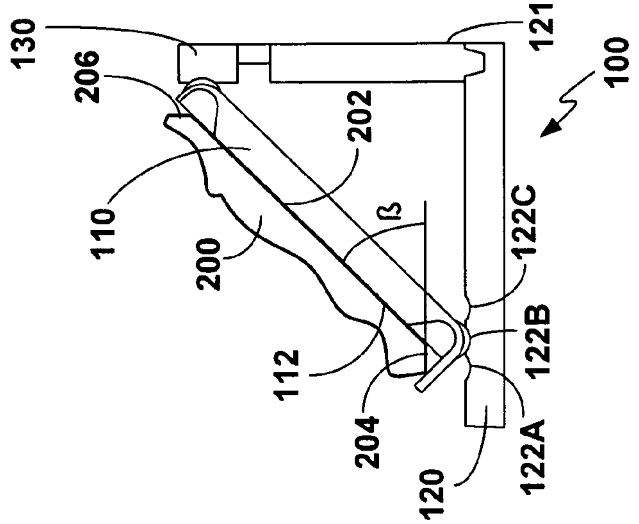
FIGS. 4A and 4B illustrate a crown molding segment supported by the jig of FIG. 1 following a cutting operation.
Figure 4A:
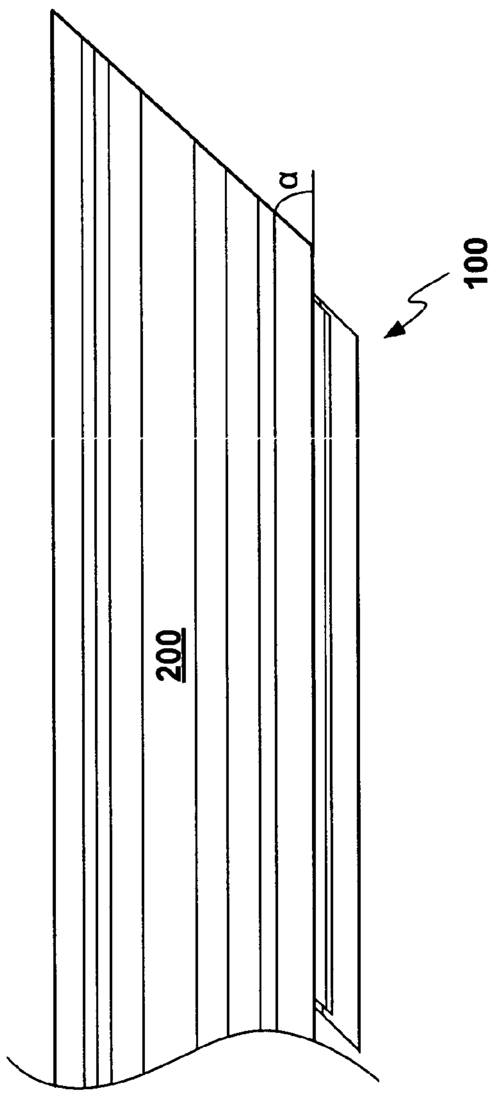

FIGS. 4A and 4B illustrate crown molding segment 200 supported by jig 100 following a cutting operation. As shown in FIG. 4B, when crown molding segment 200 supported by jig 100, back surface 202 of crown molding segment 200 rests against support surface 112 of jig 100. Bottom surface 202 of crown molding segment 200 touches lip 116 while top surface 206 is unsupported. For cutting a crown molding segment for the opposing side of a corner, e.g., crown molding segment 250, back surface 202 would rest against support surface 112, but top surface 206 would touch lip 116 while bottom surface 202 would be unsupported.

Crown molding segment 200 has a spring angle of β degrees. Jig 100 is set to the spring angle configuration corresponding to the spring angle of crown molding segment 200 prior to the cutting operation. As discussed previously, common spring angles include 38, 45 and 52 degrees. During the cutting operation, molding segment 200 was cut at to an angle of α degrees. Generally, a equals one-half of the angle of a corner in which crown molding segment 200 is to be installed. For example, if a corner is measured to be 90 degrees, crown molding segment 200 should be cut at an angle of α 45 degrees.

Figure 5:
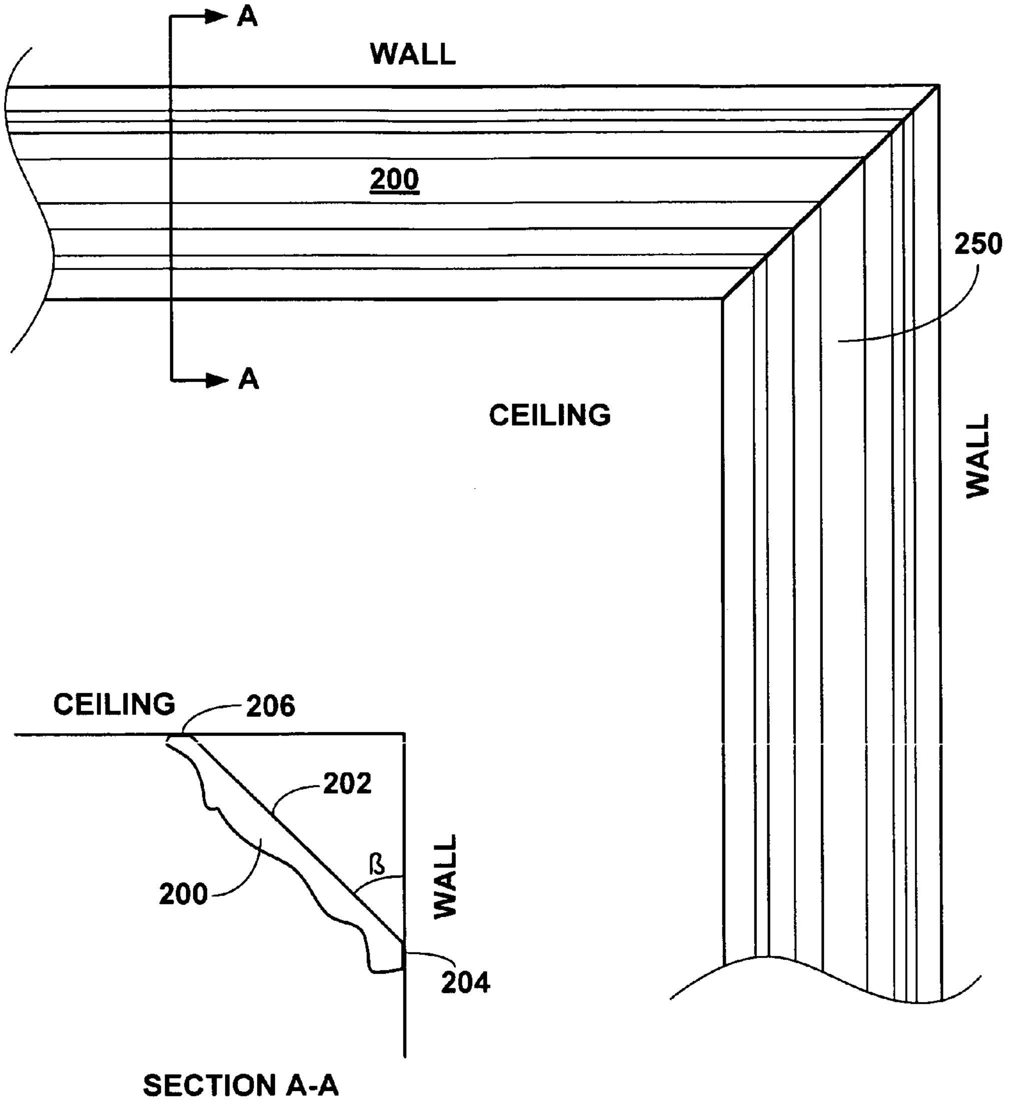
FIG. 5 illustrates two abutting crown molding segments installed in a corner of a MOM.

FIG. 5 illustrates abutting crown molding segments 200 and 250 installed in a corner of a room. As shown in section A-A, which is representative of both crown molding segments 200 and 250, top surface 206 rests against the ceiling, whereas bottom surface 204 rests against the wall. Back surface 202 is unsupported in the mounted crown molding segments. The spring angle of the crown molding segments is represented by angle β.

Figure 6:
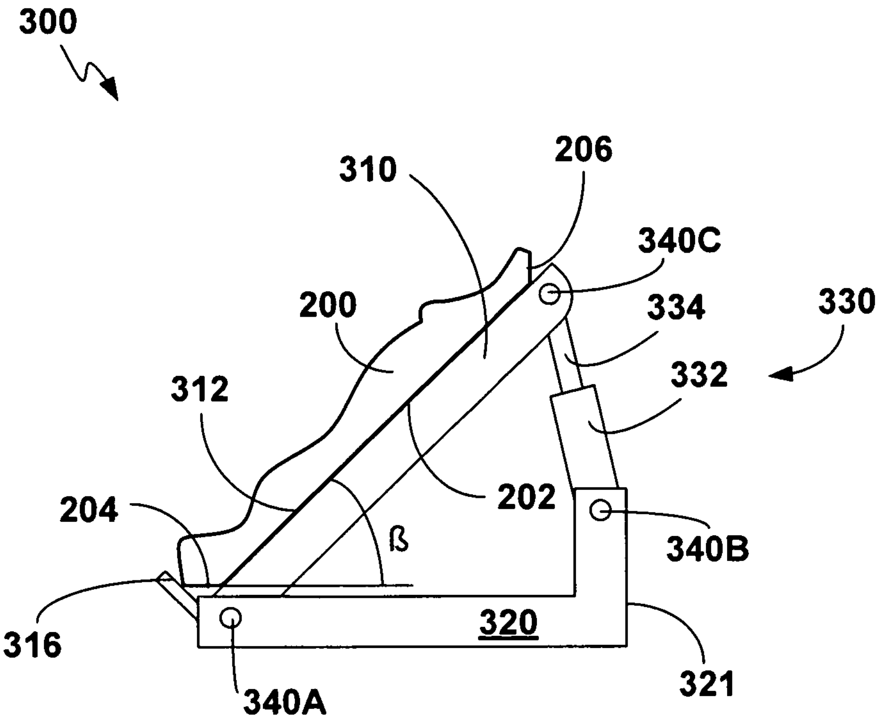
FIG. 6 illustrates a jig for supporting a crown molding segment during a cutting operation.

FIG. 6 illustrates jig 300, which has an alternative design to that of jig 100. Like jig 100, jig 300 is designed to support a crown molding segment during a cutting operation and can be adjusted to support crown molding segments having different spring angles. For example, jig 300 may be configurable to support crown molding segments for each of the standard crown molding spring angles of 38 degrees, 45 degrees and 52 degrees. For illustrative purposes, jig 300 is shown with crown molding segment 200.

Jig 300 includes support 310, which has crown molding support surface 312 and lip 316. Crown molding support surface 312 and lip 316 combine to hold crown molding segment 200 at a desired angle relative to a cutting tool.

Jig 300 also includes base 320. Base 320 includes a flat bottom surface that allows jig 300 to sit flatly on a cutting platform of a cutting tool. Jig 300 holds crown molding segment 200 in a horizontal position parallel to base 320 and the cutting platform of the cutting tool. Base 320 is adjustably attached to support 310 with pivot 340A. For example, pivot 340A may be a pin or hinge joint. Base 320 also includes outer surface 321, which is positioned at angle of approximately 90 degrees relative to the bottom of base 320 to fit flatly against a fence of a cutting device and therefore be precisely aligned the fence of the cutting device when jig 300 is placed on a cutting platform of the cutting device.

Jig 300 further includes extendable brace 330. Extendable brace 330 is rotatably attached to base 320 and rotatably attached to support 310 via pivots 340B and 340C. Extendable brace 330 includes lower portion 332 and upper portion 334 and provides a single degree of freedom for jig 300. Upper portion 334 is slideably engaged with lower portion 332 and includes a fixation mechanism to hold jig 300 to a desired spring angle configuration. Such a fixation mechanism may be, e.g., a bolt or screw that optionally engages both lower portion 332 and upper portion 334 simultaneously. In some embodiments, the fixation mechanism may allow precise positioning corresponding to multiple spring angles, such as spring angles of 38, 45 and 52 degrees. As an example, lower portion 332 may include a single hole that may be selectably aligned with one of multiple holes in upper portion 334. Each of the multiple holes in upper portion 334 may correspond to different spring angles, such as spring angles of 38, 45 and 52 degrees. In this manner, jig 300 can be precisely positioned to support crown molding segments having different spring angles for a cutting operation.

Each of support 310, base 320 and extendable brace 330 may be injection molded components made from polymers or glass-filled resins. In other instances one or more of support 310, base 320 and extendable brace 330 may be made from a metal, such as steel, wood or other suitable material.

Figure 7:
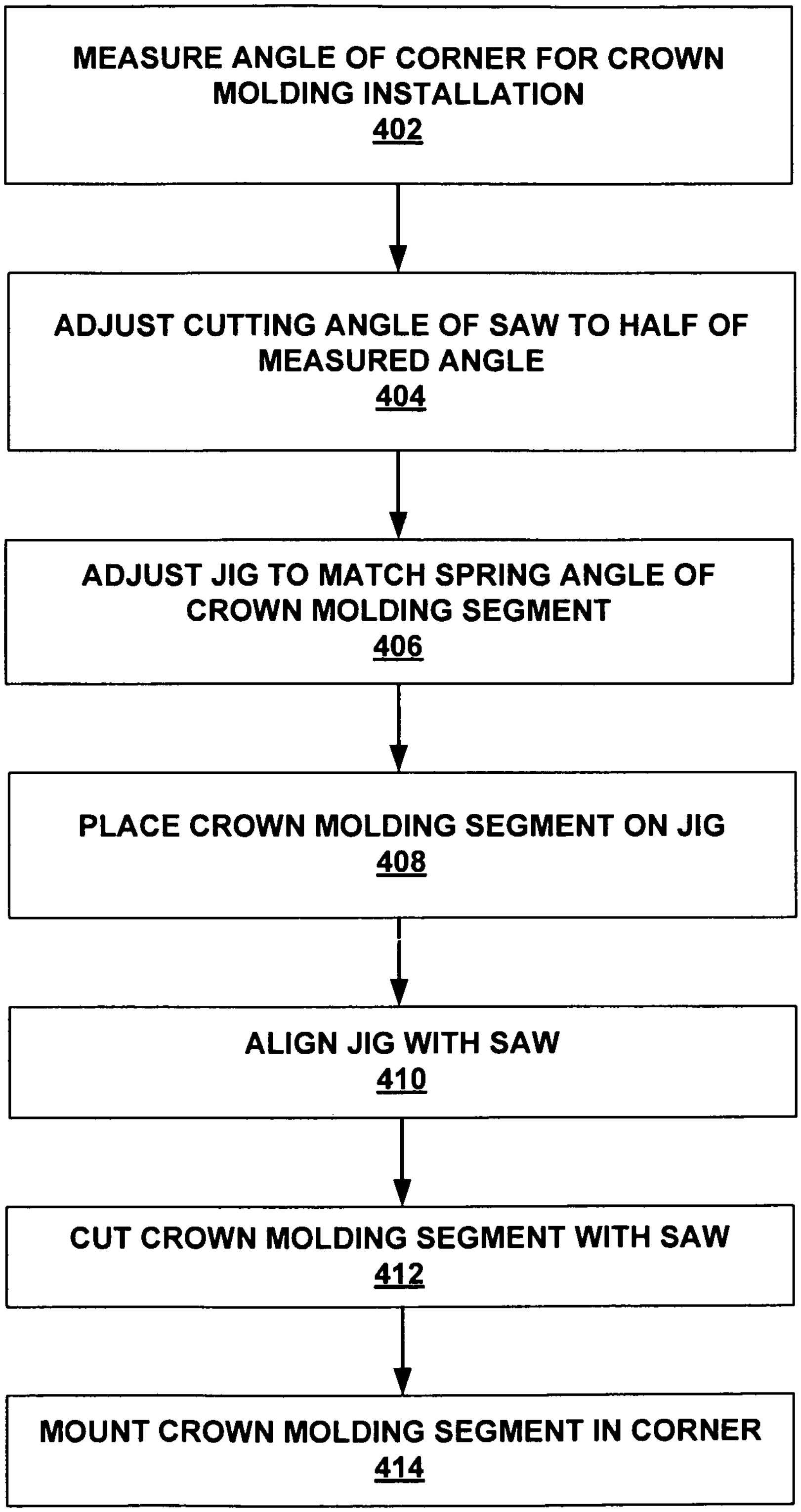
FIG. 7 illustrates a flowchart showing a method for cutting and installing a crown molding segment.

FIG. 7 illustrates a flowchart showing a method for cutting and installing a crown molding segment. First, an installer measures an angle of a corner in a room in which the crown molding segment is to be installed (402). Then the installer adjusts a cutting angle of the saw according to the measured angle (404). Generally the desired cutting angle is half of the measured angle. Then a jig is adjusted to match the spring angle of the crown molding segment to be installed (406). For example, suitable jigs include jig 100 (FIGS. 1-4) and jig 300 (FIG. 6).

Next the installer places the crown molding segment on a jig (408) and aligns the jig with the saw (410). The installer then cuts the crown molding segment with the saw at the angle set in step 404 (412). Finally, the installer installs the crown molding segment in the corner of the room after cutting the crown molding segment with the saw (414).

Figure 8:
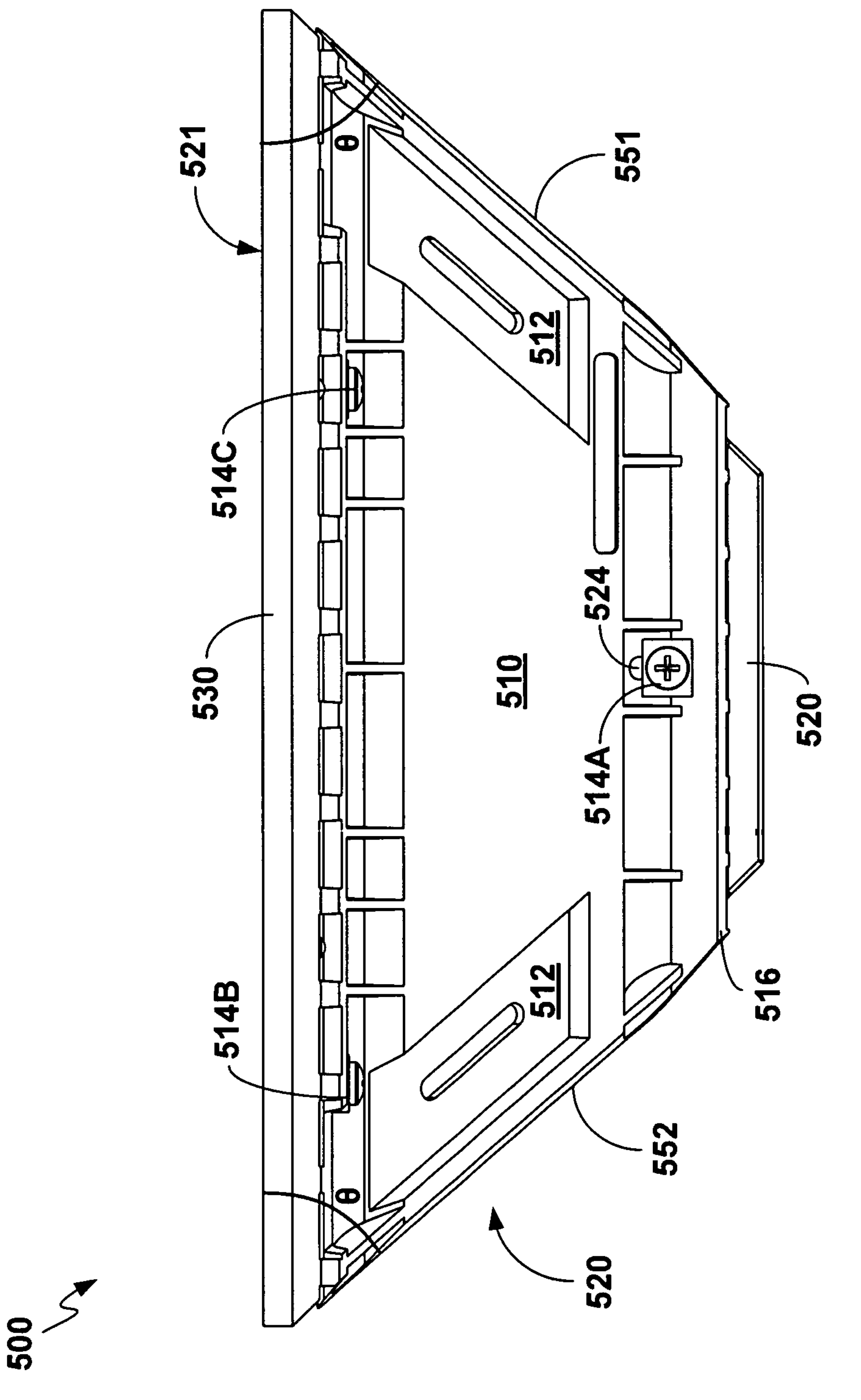
FIG. 8 illustrates a jig for supporting a crown molding segment during a cutting operation.

FIG. 8 illustrates an example embodiment of a jig 500. Jig 500 is designed to support a crown molding segment during a cutting operation and can be adjusted to support crown molding segments having different spring angles. For example, jig 500 may be configurable to support crown molding segments for each of a set of pre-defined, industry-standard crown molding spring angles, such as the commonly used spring angles of 38 degrees, 45 degrees and 52 degrees. Jig 500 is substantially similar to jig 100 except that jig 500 has an isosceles trapezoidal footprint instead of a parallelogram footprint. For brevity, aspects of jig 500 already described with respect to jig 100 are described in limited or no detail with respect to jig 500.

In this example, jig 500 includes support 510, which has crown molding support surfaces 512 and lip 516. Crown molding support surfaces 512 and lip 516 combine to hold a crown molding segment (not shown) at a desired angle relative to a cutting tool during a cutting operation.

Jig 500 also includes base 520, which provides stable positioning of the jig on a cutting platform or other workspace. For example, base 520 includes a flat bottom surface that allows jig 500 to sit flatly on a cutting platform of a cutting tool. Because lip 516 is at a consistent height relative to base 520, jig 500 supports a crown molding segment in a horizontal position parallel to the cutting platform of the cutting tool. Base 520 is adjustably attached to support 510 via bolt 514A. Base 520 includes slots 524 and grooves (not shown), which combine with bolt 514A allow support 510 to be adjusted to provide multiple relative angles between support surface 512 and the bottom surface of base 520.

Jig 500 further includes extendable brace 530. Extendable brace 530 is fixedly attached to base 520 and adjustably attached to support 510 via bolts 514B and 514C. Extendable brace 530 is attached to base 520 at an angle of approximately 90 degrees. An angle of approximately 90 degrees between base 520 and extendable brace 530 allows outer surface 521 of extendable brace 530 to fit flatly against a fence of a cutting device and, therefore, be precisely aligned with the fence of the cutting device when jig 500 is placed on a cutting platform of the cutting device. Such an alignment allows for a precise cutting angle for a blade of the cutting device during a cutting operation of a crown molding segment located on jig 500. Suitable cutting devices include a chop saw, a miter saw or another cutting device. However, the side of jig 500 opposite to extendable brace 530 is also straight and can also be used to align jig 500 with the fence of the cutting device.

Extendable brace 530 provides a single degree of freedom between a lower portion and an upper portion. The length of extendable brace 530 can be adjusted by sliding the upper portion relative to the lower portion. For example, bolts or screws may be used to secure extendable brace 530 at an extension corresponding to a desired spring angle.

Jig 500 provides an isosceles trapezoidal footprint with an acute angle of θ. As one example, θ may be equal to approximately 45 degrees. In other examples, it is not necessary for the acute angles to be the same; a jig having a trapezoidal footprint with adjacent acute angles would also be suitable. This design allows jig 500 to be used to support crown molding segments during a cutting operation for both sides of a corners without adjustment of jig 500. For example, edge 551 may used to support crown molding segment 200 (FIG. 5) during a cutting operation, while edge 552 may used to support crown molding segment 250 (FIG. 5) during a cutting operation.

The isosceles trapezoidal footprint of jig 500 may provide for easier operation than the parallelogram footprint of jig 100. For example, jig 500 facilitates supporting a workpiece that interfaces at two interior angles, e.g., a crown molding segment extending to two corners of a room, or two exterior angles, e.g., a crown molding segment extending to two corners of top of a free-standing cabinet, for compound angled cutting operations on both sides of the workpiece without rotating either the workpiece or jig 500. Rather, just the angle of a miter saw could be adjusted to perform both cuts. In this manner, for such applications, jig 500 may provide for easier use and faster cutting operations than jig 100.

Various embodiments of the invention have been described. These and other embodiments are within the scope of the following claims.

The invention claimed is:

1. A jig for supporting a crown molding segment during a cutting operation comprising:

a base;

a support having a crown molding support surface defining a plane, wherein the support is attached to the base at an adjustable angle; and a length extending brace attached between the base and the support;

wherein the extendable brace adapted to hold the support and the crown molding support surface at a predetermined angle relative to the base;

wherein the extendable brace is adjustable to facilitate adjustment of the jig corresponding to multiple crown molding spring angles;

wherein the support has a rounded surface which selectively mates with one of a set of grooves in the base so as to facilitate angular adjustment of the jig;

wherein the grooves extend parallel to said plane across the length of the base and are configured to mate with the support for a different one of the multiple crown molding spring angles.

2. The jig of claim 1, wherein the length extending brace provides positive stops at multiple extension settings.

3. The jig of claim 2, wherein the positive stops correspond to crown molding spring angles of 38 degrees, 45 degrees and 52 degrees.

4. The jig of claim 1, wherein at least one of the support, the base and the length extending brace comprises an injection molded component.

5. The jig of claim 1, wherein at least one of the support, the base and the length extending brace comprises glass filled resin.

6. The jig of claim 1, wherein the extendable brace includes a lower portion attached to the base and an upper portion attached to the support.

7. The jig of claim 6, wherein the lower portion is fixed to the base, whereas the upper portion pivots relative to the support to facilitate the multiple crown molding spring angles.

8. The jig of claim 6, wherein the length extending brace provides positive stops at multiple extension settings, wherein the upper portion includes an extrusion that mates with a slot in the lower portion, wherein the extrusion is slideable in the slot to provide the multiple extension settings.

9. The jig of claim 1, wherein the base and the length extending brace are attached at an angle of approximately 90 degrees.

10. The jig of claim 1, wherein the base includes a slot that extends through the set of grooves, wherein the support includes a hole, wherein the jig further comprises a bolt that extends through the hole in the support and the slot in the base, wherein the bolt is configurable to secure the support to the base at each of the set of grooves.

11. The jig of claim 1, wherein the support includes a lip that extends beyond the crown molding support surface to support an edge of the crown molding segment when the crown molding segment is positioned on the jig.

12. The jig of claim 1, wherein the length extending brace is attached to the base at a fixed angle.

13. The jig of claim 1, wherein the jig provides an approximately trapezoidal footprint with adjacent acute angles.

14. The jig of claim 1, wherein the length extending brace is adjustable such that the crown molding support surface supports a back surface of a crown molding segment at one of multiple angles relative to the base which correspond to a spring angle of the crown molding segment such that the crown molding segment is held by the crown molding support surface at an angle corresponding to the spring angle of the crown molding segment relative to a cutting tool.

15. The jig of claim 14, wherein the jig includes at least one angled side edge which supports the crown molding segment during an angled cutting operation for sides of the crown molding segment.

16. The jig of claim 15, wherein the at least one angled side edge provides the jig with a parallelogram footprint.

17. The jig of claim 15, wherein the at least one angled side edge provides the jig with a trapezoidal footprint.

18. A jig for supporting a crown molding segment during a cutting operation comprising:

a support including a crown molding support surface defining a plane; a base connected to the support; and a means for adjusting the jig to any of a plurality of settings, wherein the plurality of settings correspond to multiple crown molding spring angles;

wherein the base comprises a set of grooves, wherein the grooves extend parallel to said plane across the length of the base and are configured to mate with the support for a different one of the multiple crown molding spring angles;

wherein a bottom surface of the support has a rounded surface which selectively mates with one of said grooves in a top surface of the base so as to facilitate angular adjustment of the jig;

wherein at least one adjustable connection member passes through the bottom surface of the support and the top surface of the base to hold the crown molding support surface at a desired spring angle when engaged.

19. A jig for supporting a crown molding segment during a cutting operation comprising:

a base;

a support having a crown molding support surface;

a lip that extends beyond the crown molding support surface to support an edge of the crown molding segment when the crown molding segment is positioned on the jig;

wherein a bottom surface of the support has a rounded surface which mates with a groove in a top surface of the base to form an adjustable joint;

wherein the adjustable joint facilitates angular adjustment of the crown molding support surface to facilitate the cutting of crown molding;

wherein the jig provides an approximately trapezoidal footprint to facilitate the cutting of crown molding at an angle;

wherein at least one adjustable connection member passes through the bottom surface of the support and the top surface of the base to hold the crown molding support surface at a desired spring angle when engaged.

20. The jig of claim 19, wherein the at least one adjustable connection member is a bolt that passes through the base and the support which holds the crown molding support surface at a desired spring angle when engaged.

* * * * *